(12) United States Patent
Lund

(10) Patent No.: US 10,399,549 B2
(45) Date of Patent: Sep. 3, 2019

(54) CONTROL VALVE FOR AUTOMATIC COMPRESSED-AIR BRAKES HAVING A SPECIAL VALVE HOUSING

(71) Applicant: KNORR-BREMSE SYSTEME FÜR SCHIENENFAHRZEUGE GMBH, Munich (DE)

(72) Inventor: Karsten Lund, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 186 days.

(21) Appl. No.: 15/509,039

(22) PCT Filed: Aug. 21, 2015

(86) PCT No.: PCT/EP2015/069196
§ 371 (c)(1),
(2) Date: Mar. 6, 2017

(87) PCT Pub. No.: WO2016/034431
PCT Pub. Date: Mar. 10, 2016

(65) Prior Publication Data
US 2017/0274885 A1   Sep. 28, 2017

(30) Foreign Application Priority Data
Sep. 4, 2014 (DE) .......................... 10 2014 112 780

(51) Int. Cl.
*B60T 15/02* (2006.01)
*B60T 13/66* (2006.01)
(Continued)

(52) U.S. Cl.
CPC .......... *B60T 15/021* (2013.01); *B60T 13/268* (2013.01); *B60T 13/665* (2013.01); *B60T 15/184* (2013.01);
(Continued)

(58) Field of Classification Search
CPC .... B60T 15/021; B60T 13/268; B60T 13/665; B60T 15/184; B60T 15/306;
(Continued)

(56) References Cited

U.S. PATENT DOCUMENTS 3,232,678 A * 2/1966 Wilson ................. B60T 15/302
                                                         303/66
3,554,615 A * 1/1971 Worbois et al. ........ B60T 15/42
                                                         303/36
(Continued)

FOREIGN PATENT DOCUMENTS

BE      644 029 A       6/1964
CN      103189248 A     7/2013
(Continued)

OTHER PUBLICATIONS

Machine Translation in English for DE 102011112549 A1; Inventor: Heller et al.; 7 pages; Retreive Date: Oct. 10, 2018.*
(Continued)

*Primary Examiner* — Xuan Lan Nguyen
(74) *Attorney, Agent, or Firm* — Barnes & Thornburg LLP

(57) ABSTRACT

A control valve for automatic compressed-air brakes forms a brake cylinder pressure in at least one connected brake cylinder in accordance with a pressure difference between a pressure in a continuous main air line of a train and a stored reference pressure, which is drawn from the pressure of the main air line, comprising valve means for drawing a control pressure from the pressure of the main air line in order to produce a brake cylinder pressure for applying to the brake cylinder. A first piston system provides the control pressure from the pressure of the main air line and a valve mechanism for producing the brake cylinder pressure, wherein a short-stroke first piston system actuates the accelerating element in the same valve housing interacts with a second piston (Continued)

system for actuating the valve mechanism, the second piston system being of longer stroke in relation to the first piston system.

15 Claims, 1 Drawing Sheet

(51) Int. Cl.
*B60T 15/18* (2006.01)
*B60T 15/30* (2006.01)
*B60T 17/22* (2006.01)
*B60T 13/26* (2006.01)

(52) U.S. Cl.
CPC .......... *B60T 15/187* (2013.01); *B60T 15/188* (2013.01); *B60T 15/302* (2013.01); *B60T 15/306* (2013.01); *B60T 15/308* (2013.01); *B60T 17/228* (2013.01)

(58) Field of Classification Search
CPC .... B60T 17/228; B60T 15/187; B60T 15/302; B60T 15/308; B60T 15/188
USPC ...................................................... 303/30, 35
See application file for complete search history.

(56) References Cited

U.S. PATENT DOCUMENTS

| | | | | |
|---|---|---|---|---|
| 3,994,536 A * | 11/1976 | Prada | ................ | B60T 15/52 303/64 |
| 4,052,109 A | 10/1977 | Nagase et al. | | |
| 4,135,768 A * | 1/1979 | Huber | ................ | B60T 15/42 303/68 |
| 4,480,875 A * | 11/1984 | Huber | ................ | B60T 15/42 303/38 |
| 4,552,411 A * | 11/1985 | Hintner | ................ | B60T 17/18 303/37 |
| 4,561,700 A * | 12/1985 | Goritz | ................ | B60T 15/52 303/36 |
| 4,575,158 A * | 3/1986 | Grunert | ................ | B60T 15/50 303/36 |
| 6,375,277 B1 | 4/2002 | Carroll | | |
| 6,910,744 B2 * | 6/2005 | Heller | ................ | B60T 15/185 303/27 |
| 2002/0038976 A1 | 4/2002 | Hart | | |

FOREIGN PATENT DOCUMENTS

| | | | | |
|---|---|---|---|---|
| CN | 103189250 A | 7/2013 | | |
| CN | 103270320 A | 8/2013 | | |
| DE | 12 55 700 B | 12/1967 | | |
| DE | 26 25 274 A1 | 12/1976 | | |
| DE | 10 2011 112549 A1 | 3/2013 | | |
| DE | 10 2011 112553 A1 | 3/2013 | | |
| DE | 102011112549 A1 * | 3/2013 | ........... | B60T 13/665 |
| EP | 1 273 498 A1 | 1/2003 | | |
| FR | 2 147 615 A5 | 3/1973 | | |
| GB | 1 104 557 A | 2/1968 | | |

OTHER PUBLICATIONS

Search report for International Patent Application No. PCT/EP2015/069196; dated Nov. 16, 2015.

Chinese Office Action corresponding to 201580055757.3, dated Nov. 8, 2018.

* cited by examiner

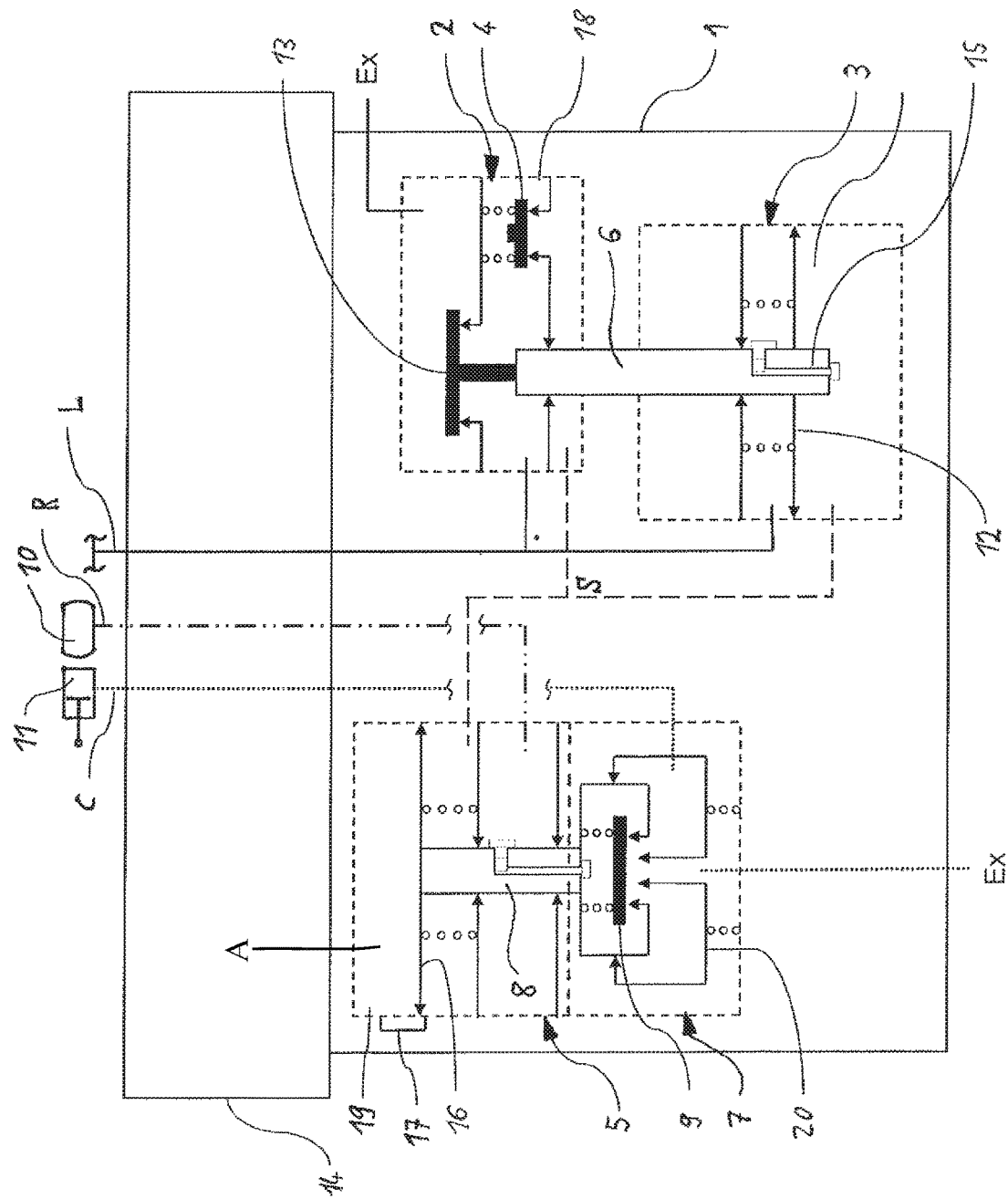

CONTROL VALVE FOR AUTOMATIC COMPRESSED-AIR BRAKES HAVING A SPECIAL VALVE HOUSING

PRIORITY CLAIM

This patent application is a U.S. National Phase of International Patent Application No. PCT/EP2015/069196, filed 21 Aug. 2015, which claims priority to German Application 10 2014 112 780.3, filed 4 Sep. 2014, the disclosures of which are incorporated herein by reference in their entirety.

FIELD

Illustrative embodiments relate to a control valve for automatic air brakes for forming a brake cylinder pressure C in at least one connected brake cylinder according to a pressure difference between a pressure in a continuous main air line L of a train and a stored reference pressure A which is derived from the pressure of the main air line L, comprising valve means for deriving a control pressure S from the pressure of the main air line L in order to generate a brake cylinder pressure C for loading the brake cylinder, consisting of a first valve mechanism for providing the control pressure S from the pressure of the main air line and a second valve mechanism for generating the brake cylinder pressure C.

The field of use may be rail vehicle construction. Rail vehicles usually have an automatic self-acting air brake, in which, starting from a regular operating pressure, the decrease in the pressure in a main air line L brings about the formation of a brake cylinder pressure C. The transfer function from a lowering pressure in the main air line L to the rising brake cylinder pressure C and vice versa is carried out by the control valves of the type in question here.

SUMMARY

Disclosed embodiments, therefore, provide a single-piece control valve which manages with few components, which can be assembled rapidly and simply, and nevertheless ensures the full functionality of a control valve which is suitable for heavy goods traffic, in particular with regard to sensitivity and signal boosting.

Disclosed embodiments provide a single-piece control valve and a short-stroke first piston system for actuating the first valve mechanism interacts in the same valve housing with a second piston system for actuating the second valve mechanism, which second piston system has a relatively long stroke.

BRIEF DESCRIPTION OF FIGURES

Further measures which improve the invention will be shown in greater detail in the following text together with the description of one preferred exemplary embodiment of the invention using the single figure. The figure shows a diagrammatic longitudinal section through a control valve as actuator for regulated compressed air loading of a brake cylinder.

DETAILED DESCRIPTION

The general principle of a control valve of the above-described type is apparent from the technical textbook Asadtschenko, V. R.: Avtomatitschekije Tormosa pordvishnogo Sostawa sheleznogo Transporta (Russian), Moscow 2002, pages 71 et seq. The control valve consists of two separate parts which are usually attached on a common valve support, the necessary compressed air connections being produced by way of the relevant connectors on the valve support Chambers for a control pressure S and a reference pressure A are situated within the valve support. Here, the control valve consists of a main part and a line part. The generation of the brake cylinder pressure C is incumbent on the main part, whereas the line part generates the control pressure S and comprises an accelerator for signal boosting.

Both pressures, A and S, serve to control the main part, the pressure A producing the reference to the regulating operating pressure, that is to say the original pressure in the main air line L in the driving position, when the brake is applied, and the control pressure S producing the time-corrected reference to the current pressure in the main air line L during the braking operation.

The main part and line part of the control valve are provided with dedicated piston systems which, starting from the pressure difference A to S in the main part and L to S in the line part, assume different positions, defined switching positions of the respectively connected valve mechanism being set which realize different compressed air connections. The division of the control valve into a main part and a line part has the disadvantage, however, of a large number of parts associated with higher complexity for producing and reconditioning the control valve.

In contrast, SU 1629210 and SU 1712217 disclose single-piece control valves. Essential constituent parts of the control valves are an L-piston which is loaded with the main air line pressure L and the supply pressure R, an integrated double seat valve for aerating or venting the connected brake cylinder, and a compensating piston which is moved by the brake cylinder pressure C counter to the force of two adjustable compression springs. Starting from a brake signal, the pressure L drops, the pressure R being substantially maintained. The pressure difference which is produced moves the L-piston, with the result that first of all a bore for filling a transfer chamber with L-air is opened and a connection between the supply air R and main air line L is closed, and subsequently the inlet valve opens and air flows out of the supply air reservoir R into the brake cylinder. As a consequence of the rising brake cylinder pressure C, the compensating piston moves and closes the inlet valve.

A disadvantage of the previously known single-piece control valves is that functional limitations are required in favor of the integration of the parts. These are manifested firstly in long piston strokes which counteract high sensitivity of the control valve and rapid signal propagation in the train. Secondly, an acceleration function for signal boosting is often absent.

Disclosed embodiments, therefore, provide a single-piece control valve which manages with few components, which can be assembled rapidly and simply, and nevertheless ensures the full functionality of a control valve which is suitable for heavy goods traffic, in particular with regard to sensitivity and signal boosting.

Disclosed embodiments provide a single-piece control valve and a short-stroke first piston system for actuating the first valve mechanism interacts in the same valve housing with a second piston system for actuating the second valve mechanism, which second piston system has a relatively long stroke.

Thus, the functionality of the main part and line part are combined in this way in a single-piece control valve. For this purpose, a sensitive member in the form of a first piston system with short strokes is used to detect the brake signal, and a member in the form of a second piston system with longer strokes relative hereto for the purpose of high performance is used for brake cylinder pressure generation.

According to at least one disclosed embodiment of the control valve, the piston stroke of the second piston system may correspond to from 1.5 to 3 times the piston stroke of the first piston system. Both a high sensitivity of the valve mechanism for providing the control pressure S and of the second valve mechanism for generating the brake cylinder pressure C is achieved within the piston stroke ratio.

According to at least one disclosed embodiment, an acceleration member may be integrated into the control valve, in a manner which serves for signal boosting so as to reliably ensure the functionality of the control valve for heavy goods traffic. Here, the acceleration member preferably comprises a venting valve and a spring-loaded check valve, the former being connected between the pressure of the main air line L and a venting channel to the atmosphere, in order to bring about a boosting effect for the braking operation in the case of a dropping pressure of the main air line L.

According to at least one disclosed embodiment, the first piston system comprises a control piston which actuates the acceleration member via a piston rod. Here, the acceleration member is preferably configured as a venting valve of the abovementioned type. In the actuated switching position which brings about a braking operation, it vents the main air line L, in order to bring about signal boosting of the braking signal sent via the line by way of a pressure drop.

According to at least one disclosed embodiment, the second piston system comprises a control piston which is assigned to it and actuates the second valve mechanism via a piston rod. The second valve mechanism is preferably configured as a double seat valve. In the actuated switching position of the double seat valve which brings about a braking operation, the brake cylinder is loaded with supply pressure R which comes from the supply air reservoir, in order to carry out the braking operation.

According to at least one disclosed embodiment, the common valve housing which contains the above-described valve structural units is releasably attached to a valve support. Here, the valve support may provide the compressed air connections C, R, L for the compressed air attachment of the control valve. The venting connectors may lead directly from the common valve housing to the outside.

As shown in the figure, the control valve may include a short-stroke first piston system 3 which is arranged in a common valve housing 1 for actuating an associated acceleration member 2 via a piston rod 6. The components may comprise the function of the so-called L-part of a control valve which derives the control pressure S from the pressure of the main air line L. Furthermore, at the beginning of a braking operation, the arrangement controls a connection from the main air line L to a channel of the additional venting means via the venting valve 13 in the region of the acceleration member 2.

A second piston system 5 which has a longer stroke relative to the first piston system 3 is arranged axially parallel thereto in the same valve housing 1, which second piston system 5 serves to actuate the valve mechanism 7 via a piston rod 8.

The valve housing 1 of the control valve is attached releasably to a valve support 14 via a flange surface. The valve support 14 may provide the compressed air connections for the brake cylinder pressure C, the supply pressure R and the main air line pressure L.

In the starting state, the main air line L may be filled with a constant pressure. Via a connecting channel 15 in the piston rod 6 of the first piston system 3, the pressure space of the control pressure S below the control piston 12 is likewise filled with the pressure from the main air line L. The pressure from the main air line L also may prevail in the pressure space of the reference pressure A above the control piston 16 of the second piston system 5 via the connecting channel 17. Therefore, the pressure spaces on the one side of the control pistons 12 of the first piston system 3 and control pistons 16 of the second piston system 5 have the same pressure level of the main air line L.

For braking, the pressure in the main air line L is reduced externally. As a consequence of this, the control pressure at the control piston 12 of the first piston system 3 cannot follow the external pressure reduction at the same time via the connecting channel 15, with the result that a force unbalance is set at the control piston 12. As a consequence of this, the control piston 12 moves in the direction of the acceleration member 2 and the venting valve 13 opens, with the result that brake signal boosting is brought about, by compressed air additionally being vented from the main air line L.

As a result of the pressure drop in the pressure space 18 on the inlet side of the venting valve 13, the spring-loaded check valve 4 of the acceleration member 2 also opens and the control pressure is likewise vented. At the control piston 16 of the second piston system 5, the decreasing control pressure generates an unbalance to the reference pressure which prevails in the opposite pressure space 19, with the result that the control piston 16 moves in the direction of the valve mechanism 7 and actuates it. Here, the connection 17 between both pressure spaces which adjoin the control piston 16 is closed. As a result of the downward movement, the outlet valve of the double seat valve 9 closes and its inlet valve opens. Compressed air flows via the inlet valve from the supply air reservoir 10 via the line for the supply pressure R and the valve mechanism 7 into the channel for the brake cylinder pressure C for loading the brake cylinder 11.

The rising brake cylinder pressure C leads to a downward movement at the piston 20 and closes the inlet valve of the double seat valve 9 when a defined pressure level is reached.

Disclosed technical utility is not restricted to the above-described preferred exemplary embodiment. Modifications from this are also conceivable which are also included in the scope of protection of the following claims. It is thus also possible, for example, that the first and/or second valve mechanism also include/includes other valve components for influencing the generation of the brake cylinder pressure.

LIST OF DESIGNATIONS

1 Valve housing
2 Acceleration member
3 First piston system
4 Check valve
5 Second piston system
6 Piston rod
7 Valve mechanism
8 Piston rod
9 Double seat valve
10 Supply air reservoir
11 Brake cylinder
12 Control piston
13 Venting valve
14 Valve support 15 Connecting duct
16 Control piston
17 Connecting duct
18 Pressure space
19 Pressure space
20 Piston
C Brake cylinder pressure
A Reference pressure
L Main air line pressure
S Control pressure
R Supply pressure

The invention claimed is:

1. A control valve for automatic air brakes for forming a brake cylinder pressure in at least one connected brake cylinder according to a pressure difference between a pressure in a continuous main air line of a train and a stored reference pressure which is derived from the pressure of the main air line, the control valve comprising:
  valve structure for deriving a control pressure from the pressure of the main air line to generate a brake cylinder pressure for loading the brake cylinder, wherein the valve structure includes a short-stroke first piston system for providing the control pressure from the pressure of the main air line and a valve mechanism for generating the brake cylinder pressure;
  an acceleration member actuated by the short-stroke first piston system; and
  a second piston system for actuating the valve mechanism,
  wherein the acceleration member interacts in a common valve housing as the second piston system for actuating the valve mechanism, and
  wherein the second piston system has a longer stroke relative to the short-stroke first piston system,
  wherein the acceleration member comprises a venting valve and, wherein an actuated switching position which brings about a braking operation, additionally vents the main air line to bring about signal boosting.

2. The control valve of claim 1, wherein the piston stroke of the second piston system corresponds to, from 1.5 to 3 times, the piston stroke of the short-stroke first piston system.

3. The control valve of claim 1, wherein the acceleration member comprises a spring-loaded check valve.

4. The control valve of claim 1, wherein the short-stroke first piston system comprises a control piston which actuates a venting valve via a piston rod.

5. The control valve of claim 1, wherein the second piston system comprises a control piston which actuates the valve mechanism via a piston rod.

6. A control valve for automatic air brakes for forming a brake cylinder pressure in at least one connected brake cylinder according to a pressure difference between a pressure in a continuous main air line of a train and a stored reference pressure which is derived from the pressure of the main air line, the control valve comprising:
  valve structure for deriving a control pressure from the pressure of the main air line to generate a brake cylinder pressure for loading the brake cylinder, wherein the valve structure includes a short-stroke first piston system for providing the control pressure from the pressure of the main air line and a valve mechanism for generating the brake cylinder pressure;
  an acceleration member actuated by the short-stroke first piston system; and
  a second piston system for actuating the valve mechanism,
  wherein the acceleration member interacts in a common valve housing as the second piston system for actuating the valve mechanism, and
  wherein the second piston system has a longer stroke relative to the short-stroke first piston system,
  wherein the valve mechanism is a double seat valve and, wherein an actuated switching position which brings about a braking operation, loads the brake cylinder with a supply pressure which comes from a supply air reservoir.

7. The control valve of claim 6, wherein the piston stroke of the second piston system corresponds to, from 1.5 to 3 times, the piston stroke of the short-stroke first piston system.

8. The control valve of claim 6, wherein the acceleration member comprises a spring-loaded check valve.

9. The control valve of claim 6, wherein the short-stroke first piston system comprises a control piston which actuates a venting valve via a piston rod.

10. The control valve of claim 6, wherein the second piston system comprises a control piston which actuates the valve mechanism via a piston rod.

11. A control valve for automatic air brakes for forming a brake cylinder pressure in at least one connected brake cylinder according to a pressure difference between a pressure in a continuous main air line of a train and a stored reference pressure which is derived from the pressure of the main air line, the control valve comprising:
  valve structure for deriving a control pressure from the pressure of the main air line to generate a brake cylinder pressure for loading the brake cylinder, wherein the valve structure includes a short-stroke first piston system for providing the control pressure from the pressure of the main air line and a valve mechanism for generating the brake cylinder pressure;
  an acceleration member actuated by the short-stroke first piston system; and
  a second piston system for actuating the valve mechanism,
  wherein the acceleration member interacts in a common valve housing as the second piston system for actuating the valve mechanism, and
  wherein the second piston system has a longer stroke relative to the short-stroke first piston system,
  wherein the common valve housing is attached releasably to a valve support which provides compressed air connections.

12. The control valve of claim 11, wherein the piston stroke of the second piston system corresponds to, from 1.5 to 3 times, the piston stroke of the short-stroke first piston system.

13. The control valve of claim 11, wherein the acceleration member comprises a spring-loaded check valve.

14. The control valve of claim 11, wherein the short-stroke first piston system comprises a control piston which actuates a venting valve via a piston rod.

15. The control valve of claim 11, wherein the second piston system comprises a control piston which actuates the valve mechanism via a piston rod.

* * * * *